US012801053B2

(12) United States Patent
Takeuchi et al.

(10) Patent No.: US 12,801,053 B2
(45) Date of Patent: Nov. 17, 2026

(54) ELECTROPHOTOGRAPHIC IMAGE FORMING CARRIER, ELECTROPHOTOGRAPHIC IMAGE FORMING DEVELOPER, ELECTROPHOTOGRAPHIC IMAGE FORMING METHOD, AND ELECTROPHOTOGRAPHIC IMAGE FORMING APPARATUS

(71) Applicants: Kento Takeuchi, Shizuoka (JP); Tohru Suganuma, Shizuoka (JP); Masashi Nagayama, Shizuoka (JP); Tomomi Suzuki, Shizuoka (JP)

(72) Inventors: Kento Takeuchi, Shizuoka (JP); Tohru Suganuma, Shizuoka (JP); Masashi Nagayama, Shizuoka (JP); Tomomi Suzuki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 465 days.

(21) Appl. No.: 18/506,417

(22) Filed: Nov. 10, 2023

(65) Prior Publication Data

US 2024/0160122 A1 May 16, 2024

(30) Foreign Application Priority Data

Nov. 16, 2022 (JP) ................................ 2022-183121

(51) Int. Cl.
*G03G 9/113* (2006.01)
*G03G 9/107* (2006.01)
*G03G 15/09* (2006.01)

(52) U.S. Cl.
CPC ........... *G03G 9/1139* (2013.01); *G03G 9/108* (2020.08); *G03G 9/1133* (2013.01); *G03G 9/1136* (2013.01); *G03G 15/09* (2013.01)

(58) Field of Classification Search
CPC .... G03G 9/1139; G03G 9/108; G03G 9/1133; G03G 9/1136; G03G 15/09
See application file for complete search history.

(56) References Cited

U.S. PATENT DOCUMENTS 6,124,066 A 9/2000 Kim et al.
2011/0008724 A1 * 1/2011 Yoshioka ............ G03G 9/0825 430/97

(Continued)

FOREIGN PATENT DOCUMENTS

JP H11202560 A * 7/1999
JP 2007-248614 9/2007

(Continued)

OTHER PUBLICATIONS

English machine translation of the description of JP-H11202560-A (Year: 1999).*

(Continued)

*Primary Examiner* — Boone Alexander Evans
(74) *Attorney, Agent, or Firm* — Grüneberg Global IP, PLLC

(57) ABSTRACT

An electrophotographic image forming carrier includes core particles and a coating layer coating a surface of the core particles. The coating layer contains antimony-containing particles comprising inorganic fine particles A and antimony-doped tin oxide disposed on a surface of the inorganic fine particles A. The electrophotographic image forming carrier has an apparent density of 2.0 g/cm$^3$ or more and 2.5 g/cm$^3$ or less.

11 Claims, 2 Drawing Sheets

(56) References Cited

U.S. PATENT DOCUMENTS

| | | | | |
|---|---|---|---|---|
| 2017/0329247 | A1 | 11/2017 | Murasawa et al. | |
| 2018/0113393 | A1 | 4/2018 | Seki et al. | |
| 2019/0204774 | A1* | 7/2019 | Anno | G03G 9/1085 |
| 2020/0166867 | A1 | 5/2020 | Nagayama et al. | |
| 2020/0319571 | A1* | 10/2020 | Takeuchi | G03G 15/08 |
| 2022/0187729 | A1 | 6/2022 | Nagayama et al. | |
| 2022/0283523 | A1 | 9/2022 | Nagayama et al. | |
| 2022/0291604 | A1 | 9/2022 | Suzuki et al. | |
| 2022/0291803 | A1 | 9/2022 | Kishida et al. | |
| 2023/0196004 | A1 | 6/2023 | Minoru et al. | |
| 2023/0206108 | A1 | 6/2023 | Masuko et al. | |
| 2023/0305439 | A1 | 9/2023 | Nagayama et al. | |

FOREIGN PATENT DOCUMENTS

| | | | | |
|---|---|---|---|---|
| JP | 2007248614 | A | * | 9/2007 |
| JP | 2013-113924 | | | 6/2013 |
| JP | 2014-170103 | A | | 9/2014 |
| JP | 2016-090644 | A | | 5/2016 |
| JP | 2018-066892 | A | | 4/2018 |

OTHER PUBLICATIONS

English machine translation of the description of JP-2007248614-A (Year: 2007).*

Extended European Search Report dated Apr. 4, 2024, in European Patent Application No. 23205618.4, 9 pages.

* cited by examiner

ELECTROPHOTOGRAPHIC IMAGE FORMING CARRIER, ELECTROPHOTOGRAPHIC IMAGE FORMING DEVELOPER, ELECTROPHOTOGRAPHIC IMAGE FORMING METHOD, AND ELECTROPHOTOGRAPHIC IMAGE FORMING APPARATUS

CROSS-REFERENCE TO RELATED APPLICATIONS

This patent application is based on and claims priority pursuant to 35 U.S.C. § 119(a) to Japanese Patent Application No. 2022-183121, filed on Nov. 16, 2022, in the Japan Patent Office, the entire disclosure of which is hereby incorporated by reference herein.

BACKGROUND

Technical Field

The present disclosure relates to an electrophotographic image forming carrier, an electrophotographic image forming developer, an electrophotographic image forming method, and an electrophotographic image forming apparatus.

Related Art

In recent years, accompanying the increase in printing speed, there is a strong demand for a carrier having the ability to quickly charge toner.

When toner deteriorates after printing during a long period of time and adheres to the surface of the carrier, toner spent is generated. Due to the toner spent, the electric resistance of the carrier fluctuates more, so that the toner is not sufficiently charged by triboelectric charging by the carrier. This causes problems such as toner scattering in which toner deposits outside the electrophotographic image forming apparatus, and scumming in which toner develops in a blank part.

Moreover, due to the even faster image developing in recent years, the carrier is subjected to strong stress inside the electrophotographic image forming apparatus, the core particles are exposed when the coating layer of the carrier is scraped or peeled off, and the electric resistance of the carrier fluctuates. Therefore, there is a problem in that the carrier is displaced onto the electrostatic latent image bearer and so-called carrier adhesion occurs. When carrier adhesion occurs, white spots appear at an edge part and a central part of an electrophotographic image.

SUMMARY

An electrophotographic image forming carrier according to embodiments of the present invention as a means for solving the above-described problems comprises core particles and a coating layer coating a surface of the core particles. The coating layer contains antimony-containing particles comprising inorganic fine particles A and antimony-doped tin oxide disposed on a surface of the inorganic fine particles A. The electrophotographic image forming carrier has an apparent density of 2.0 g/cm$^3$ or more and 2.5 g/cm$^3$ or less.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
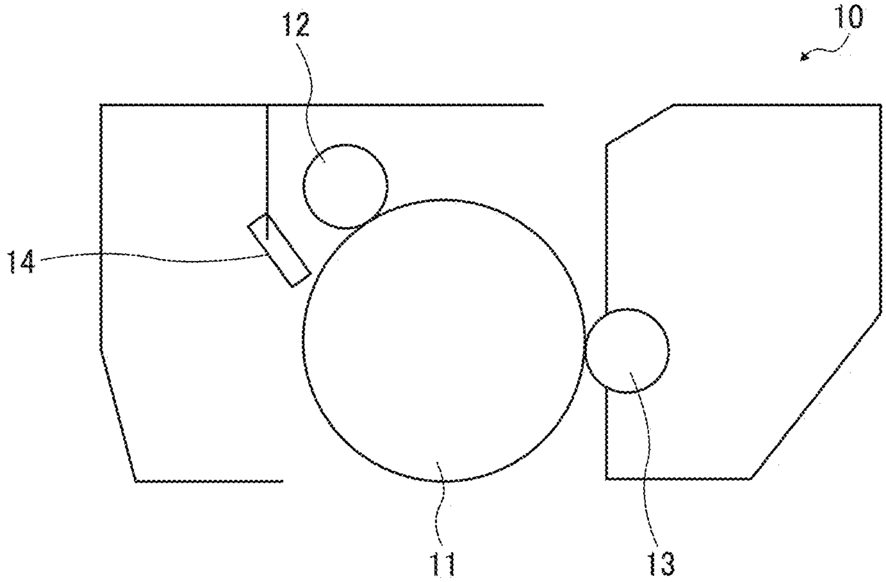
FIG. 1 is a diagram illustrating a process cartridge according to an embodiment of the present invention.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

According to embodiments of the present invention, an electrophotographic image forming carrier is provided that prevents carrier adhesion and generation of ghost images during printing over an extended period of time.

(Electrophotographic Image Forming Carrier)

The electrophotographic image forming carrier according to an embodiment of the present invention includes core particles and a coating layer coating a surfaces of the core particles, and if desired, further includes other components.

The coating layer contains antimony-containing particles comprising inorganic fine particles A and antimony-doped tin oxide disposed on a surface of the inorganic fine particles A.

The electrophotographic image forming carrier has an apparent density of 2.0 g/cm$^3$ or more and 2.5 g/cm$^3$ or less.

As a result of diligent studies, the inventors of the present invention found that, when the coating layer contains antimony-containing particles comprising inorganic fine particles A and antimony-doped tin oxide disposed on a surface of the inorganic fine particles A, it is possible to prevent carrier adhesion and the generation of ghost images during printing over an extended period of time.

Antimony has excellent conductivity, so that it is possible to impart high conductivity to the electrophotographic image forming carrier by adding a small amount of the antimony-containing particles. By reducing the amount of the antimony-containing particles being added, it is possible to prevent detachment of the antimony-containing particles and exposure of the antimony-containing particles when the electrophotographic image forming carrier is scraped.

Further, the antimony-doped tin oxide, obtained by doping tin oxide with antimony, serves as a resistance adjuster having very high capacity. The use of tin oxide can increase the thickness of the coating layer of the resistance adjuster from the viewpoint of conductivity balance, and thus, the inorganic fine particles A serving as a base material can be prevented from being exposed, so that the carriers can be prevented from being scraped even during collision therebetween.

By disposing the antimony-doped tin oxide on the surface of the inorganic fine particles A (may be referred to as "substrate particles" hereinafter), it is possible to prevent the antimony-containing particles from being detached from the coating layer even when having broken into fragments in the coating layer.

<Apparent Density>

The apparent density (may be referred to as "bulk density" hereinafter) of the electrophotographic image forming carrier is 2.0 g/cm$^3$ or more and 2.5 g/cm$^3$ or less, and preferably 2.2 g/cm$^3$ or more and 2.4 g/cm$^3$ or less. When the apparent density is 2.0 g/cm$^3$ or more, the mass per particle of the electrophotographic image forming carrier is large, so that particles are not easily displaced on an electrostatic latent image bearer (may be referred to as "drum" hereinafter) and carrier adhesion can be prevented. When the apparent density is 2.5 g/cm$^3$ or less, the mass per particle of the electrophotographic image forming carrier is small, so that the electrophotographic image forming carrier is less likely to be subjected to centrifugal force during printing at high speed and carrier adhesion can be prevented.

A method of measuring the apparent density is not particularly limited and can be appropriately selected according to a purpose. For example, the apparent density may be measured in accordance with JIS (Japanese Industrial Standards)-Z2504.

<Coating Layer>

The coating layer coats the surface of the core particles of the electrophotographic image forming carrier.

The coating layer contains antimony-containing particles comprising inorganic fine particles A and antimony-doped tin oxide disposed on a surface of the inorganic fine particles A, preferably contains a resin, a coupling agent, and inorganic fine particles B, and further contains other components, if desired.

<<Antimony-Containing Particles>>

The antimony-containing particles comprise the inorganic fine particles A and antimony-doped tin oxide disposed on the surface of the inorganic fine particles A. The antimony-containing particles contain antimony having excellent conductivity, so that it is possible to impart high conductivity to the electrophotographic image forming carrier by adding a small amount of the antimony-containing particles. By reducing the content of the antimony-containing particles, it is possible to prevent the antimony-containing particles from being detached and to prevent the fine particles from being exposed when the coating layer is scraped.

—Antimony-Doped Tin Oxide—

The type of antimony is not particularly limited, can be appropriately selected according to a purpose, and examples thereof include, but are not limited to, diantimony pentoxide and diantimony trioxide. Among these, diantimony pentoxide is preferable, because by using diantimony pentoxide, excellent charging stability can be obtained and toner scattering, carrier adhesion, and generation of ghost images can be prevented. Further, diantimony pentoxide is also preferable, because diantimony pentoxide is less harmful to the human body.

The inorganic fine particles A are not particularly limited and can be appropriately selected according to a purpose. Examples of the inorganic fine particles A include, but are not limited to, fine particles of metals such as gold, silver, copper, silica, and aluminum, titanium oxide, tin oxide, zinc oxide, zirconium oxide, indium oxide, antimony oxide, calcium oxide, ITO, silicone oxide, colloidal silica, aluminum oxide, yttrium oxide, cobalt oxide, copper oxide, iron oxide, manganese oxide, niobium oxide, vanadium oxide, selenium oxide, barium sulfate, magnesium oxide, magnesium hydroxide, silicon dioxide, boron nitride, silicon nitride, potassium titanate, hydrotalcite, antimony-doped or tungsten-doped tin oxide, and tin-doped indium oxide. Among these, aluminum oxide and titanium oxide are preferable, and aluminum oxide is more preferable from the viewpoint that better charging stability can be obtained and the occurrence of carrier adhesion can be more reliably prevented.

The content of the antimony-containing particles is not particularly limited and can be appropriately selected according to a purpose. However, the content of the antimony-containing particles is preferably 20 parts by mass or more and 60 parts by mass or less, and more preferably 30 parts by mass or more and 50 parts by mass or less with respect to 100 parts by mass of the coating layer. When the content of the antimony-containing particles is 20 parts by mass or more and 60 parts by mass or less, it is possible to prevent the antimony-containing particles from being detached and to prevent the fine particles from being exposed when the coating layer is scraped, so that carrier adhesion can be prevented.

The equivalent circle diameter of the antimony-containing particles is not particularly limited and can be appropriately selected according to a purpose, but is preferably 500 nm or more and 1,000 nm or less. When the equivalent circle diameter is 500 nm or more, the antimony-containing particles are appropriately large, so that a resistance value of the carrier can be efficiently reduced. When the equivalent circle diameter is 1,000 nm or less, the antimony-containing particles are less likely to detach from the surface of the coating layer.

A method of measuring the equivalent circle diameter is not particularly limited and can be appropriately selected according to a purpose. For example, before manufacturing the electrophotographic image forming carrier, the equivalent circle diameter may be measured by using a NANOTRAC UPA series (manufactured by Nikkiso Co., Ltd.). After manufacturing the electrophotographic image forming carrier, the equivalent circle diameter may be confirmed by cutting the coating layer of the electrophotographic image forming carrier using an FIB and observing the cross section with SEM, EDX, or the like.

Specifically, the electrophotographic image forming carrier is mixed with an embedding resin (manufactured by Devcon, a two-liquid mixture, an epoxy resin having a curing time of 30 minutes). The mixture is left to stand overnight or longer to cure, and mechanical polishing is used to obtain a sample having a rough cross section. The produced cross-sectional sample is subjected to a cross-section polisher (SM-09010, manufactured by JEOL Ltd.) at an acceleration voltage of 5.0 kV and a beam current of 120 μA to finish the cross section. An image of the finished cross section is captured by using a scanning electron microscope (MERLIN, manufactured by Carl Zeiss AG) at an acceleration voltage of 0.8 kV and a magnification of 30,000 times. The captured image is incorporated into a TIFF image to measure the equivalent circle diameter of 100 particles by using IMAGE-PRO PLUS, manufactured by Media Cybernetics, Inc., and an average value of the equivalent circle diameter is calculated.

Note that a method of confirming the equivalent circle diameter is not limited thereto. The thickness of the coating layer can be similarly measured from the captured image. All particles have individual differences and the thickness of the coating layer varies depending on the location. Accordingly, one particle is measured not only at one location, but a statistically reliable number of particles and locations is subjected to the measurement.

The inorganic fine particles are preferably surface-treated with the antimony-doped tin oxide and used as the antimony-containing particles. When the inorganic fine particles are surface-treated with the antimony-doped tin oxide, even if the antimony-containing particles break into fragments in the coating layer, the antimony-containing particles do not detach from the coating layer. Therefore, a decrease in electric resistance of the electrophotographic image forming carrier can be prevented.

A method used in the surface treatment is not particularly limited and can be appropriately selected according to a purpose. For example, the surface treatment may be implemented by simultaneously adding a hydrochloric acid solution of tin(II) chloride and antimony trichloride and a sodium hydroxide solution to a substrate powder suspension in which alumina is dispersed, adjusting the pH, and then, washing and filtering including decantation, drying, baking, and pulverization of the obtained product.

The conductivity (may be referred to as "volume resistance value" hereinafter) of the antimony-containing particles is not particularly limited and can be appropriately selected according to a purpose. However, the conductivity of the antimony-containing particles is preferably 0.5 Ω·cm or more and 4.0 Ω·cm or less. When the conductivity is 4.0 Ω·cm or less, high conductivity can be imparted to the electrophotographic image forming carrier, even when the added amount of the antimony-containing particles is small. When the conductivity is 0.5 Ω·cm or more, both high conductivity and durability can be achieved.

<<Resin>>

The resin is not particularly limited and can be appropriately selected according to a purpose. Examples of the resin include, but are not limited to, silicone resins, acrylic resins, amino resins, polyvinyl resins, polystyrene resins, halogenated olefin resins, polyester, polycarbonate, polyethylene, polyvinyl fluoride, polyvinylidene fluoride, polytrifluoroethylene, polyhexafluoropropylene, copolymers of vinylidene fluoride and vinyl fluoride, and fluoroterpolymers such as terpolymers of tetrafluoroethylene, vinylidene fluoride, and a non-fluorinated monomer. These resins may be used alone or in combination of two or more types. Among these resins, silicone resins and acrylic resins are preferable, because these resins increase the durability of the coating layer.

The acrylic resins have high adhesiveness and low brittleness, and thus, exhibit excellent wear resistance. However, acrylic resins have high surface energy, and thus, when being used in combination with a toner in which spent easily occurs, the charge amount may decrease due to the accumulation of toner spent. By using the acrylic resin together with a silicone resin having low surface energy, the spent of toner components is less likely to occur, and the above-described problem can be solved.

On the other hand, the silicone resin has low adhesiveness and high brittleness, and thus, has poor wear resistance. Therefore, by utilizing properties of the acrylic resin and the silicone resin in a well-balanced manner, it is possible to obtain a coating layer in which toner spent is less likely to occur and which has excellent wear resistance.

The acrylic resin is not particularly limited, as long as the resin has an acrylic component, and can be appropriately selected according to a purpose. The acrylic resins described above may be used alone, or may be used simultaneously with at least one other component reacting in a cross-linking reaction.

The other component reacting in a cross-linking reaction is not particularly limited, may be appropriately selected according to a purpose, and examples thereof include amino resins and an acidic catalyst.

The amino resin is not particularly limited, may be appropriately selected according to a purpose, and examples thereof include guanamine and melamine resins.

The acidic catalyst is not particularly limited and can be appropriately selected according to a purpose. Examples of the acidic catalyst include, but are not limited to, completely alkylated catalysts, methylol group-type catalysts, imino group-type catalysts, and catalysts having reactive groups such as methylol groups or imino groups.

The silicone resin is not particularly limited and can be appropriately selected according to a purpose. Examples of the silicone resin include, but are not limited to, modified silicone resins modified with alkyd, polyester, epoxy, acryl, urethane, and the like, and straight silicone resins including only organosiloxane bonds.

Commercially available products may be used as the modified silicone resins. Examples of the modified silicone resins include, but are not limited to, KR206 (alkyd-modified), KR5208 (acryl-modified), ES1001N (epoxy-modified), and KR305 (urethane-modified) available from Shin-Etsu Chemical Co., Ltd., and SR2115 (epoxy-modified) and SR2110 (alkyd-modified) available from Toray Dow Corning Silicone Co., Ltd. These resins may be used alone or in combination of two or more types.

Commercially available products may be used as the straight silicone resin. Examples of the straight silicone resin include, but are not limited to, KR271, KR255, and KR152 available from Shin-Etsu Chemical Co., Ltd., and SR2400, SR2406, and SR2410 available from Toray Dow Corning Silicone Co., Ltd. These resins may be used alone or in combination of two or more types.

The silicone resin may be used in combination with another component reacting in a cross-linking reaction and a charge amount adjusting component.

When a silicone resin, an acrylic resin, or a combination of these is used as the resin, it is possible to increase the film strength by using a polycondensation catalyst to condensate and cross-link the silanol groups.

The polycondensation catalyst is not particularly limited, may be appropriately selected according to a purpose. Examples of the polycondensation catalyst include, but are not limited to, titanium-based catalysts, tin-based catalysts, zirconium-based catalysts, and aluminum-based catalysts. Among these catalysts, titanium-based catalysts are preferred.

Among the titanium-based catalysts, titanium diisopropoxy-bis(ethylacetoacetate) is preferred, because this catalyst strongly promotes the condensation reaction of silanol groups and is less likely to be deactivated.

<<Coupling Agent>>

The coupling agent may be contained in the coating layer, thereby stably dispersing the inorganic fine particles A and the later-described inorganic fine particles B in the coating layer.

The coupling agent is not particularly limited and may be appropriately selected according to a purpose. Examples of the coupling agent include, but are not limited to, a silane coupling agent.

The silane coupling agent is not particularly limited and may be appropriately selected according to a purpose. Examples of the silane coupling agent include, but are not limited to, γ-(2-aminoethyl)aminopropyltrimethoxysilane, γ-(2-aminoethyl)aminopropyl methyldimethoxysilane, γ-methacryloxypropyltrimethoxysilane, N-β-(N-vinylbenzylaminoethyl)-γ-aminopropyltrimethoxysilane hydrochloride, γ-glycidoxypropyltrimethoxysilane, γ-mercaptopropyl trimethoxysilane, methyltrimethoxysilane, methyltriethoxysilane, vinyltriacetoxysilane, γ-chloropropyltrimethoxysilane, hexamethyldisilazane, γ-anilinopropyltrimethoxysilane, vinyltrimethoxysilane, octadecyldimethyl [3-(trimethoxysilyl)propyl]ammonium chloride, γ-chloropropylmethyldimethoxysilane, methyltrichlorosilane, dimethyldichlorosilane, trimethylchlorosilane, allyltriethoxysilane, 3-aminopropylmethyldiethoxysilane, 3-aminopropyltrimethoxysilane, dimethyldiethoxysilane, 1,3-divinyltetramethyldisilazane, and methacryloxyethyldimethyl(3-trimethoxysilylpropyl)ammonium chloride. These coupling agents may be used alone or in combination of two or more types of coupling agents.

The silane coupling agent may be appropriately synthesized, or a commercially available product may be used as the silane coupling agent.

The commercially available product is not particularly limited, may be appropriately selected according to a purpose, and examples thereof include, but are not limited to, AY43-059, SR6020, SZ6023, SH6026, SZ6032, SZ6050, AY43-310M, SZ6030, SH6040, AY43-026, AY43-031, SH6062, Z-6911, SZ 6300, SZ 6075, SZ 6079, SZ 6083, SZ 6070, SZ 6072, Z-6721, AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (manufactured by Toray Silicone Co., Ltd.).

The content of the silane coupling agent is not particularly limited and may be appropriately selected according to a purpose, but is preferably 0.1 mass % or more and 10.0 mass % or less with respect to the silicone resin. When the content of the silane coupling agent is 0.1 mass % or more, the adhesiveness between the core particles/inorganic particles and the silicone resin is improved, and the core particles/inorganic particles are prevented from detaching from the coating layer during use over a long period of time. When the content is 10.0 mass % or less, toner filming does not occur during use over a long period of time.

<<Inorganic Fine Particles B>>

As the inorganic fine particles B, the same material as for the inorganic fine particles A contained in the antimony-containing particles may be used, or a different material may be used. If the coating layer includes the inorganic fine particles B, the durability of the coating layer against rubbing can be improved, and deterioration due to wear and scraping can be prevented.

The durability of the coating layer is also improved by including the antimony-containing particles. However, the electric resistance value of the electrophotographic image forming carrier changes depending on the content of the antimony-containing particles. Therefore, if the coating layer includes the inorganic fine particles B, the durability of the coating layer can be ensured, while the electric resistance value is maintained constant.

The inorganic fine particles B are not particularly limited and can be appropriately selected according to a purpose. Examples of the inorganic fine particles B include, but are not limited to, metal fine particles such as gold, silver, copper, silica, and aluminum, titanium oxide, tin oxide, zinc oxide, zirconium oxide, indium oxide, antimony oxide, calcium oxide, ITO, silicone oxide, colloidal silica, aluminum oxide, yttrium oxide, cobalt oxide, copper oxide, iron oxide, manganese oxide, niobium oxide, vanadium oxide, selenium oxide, barium sulfate, magnesium oxide, magnesium hydroxide, silicon dioxide, boron nitride, silicon nitride, potassium titanate, hydrotalcite, antimony-doped tin oxide or tungsten, and tin-doped indium oxide. These materials may be used alone or in combination of two or more types. Among these, barium sulfate, magnesium oxide, and magnesium hydroxide are preferable, and barium sulfate is more preferable, because by using barium sulfate, excellent charging stability can be obtained and toner scattering, carrier adhesion, and generation of ghost images can be prevented. Further, the barium sulfate is also preferable, because barium sulfate is white and has a high ability to charge negatively charged toner.

It is preferable that the inorganic fine particles B are white, because in this case, the inorganic fine particles B have little effect on the color of the toner, even when the inorganic fine particles B are detached from the coating layer.

The content of the inorganic fine particles B is not particularly limited and can be appropriately selected according to a purpose. However, the content of the inorganic fine particles B is preferably 15 parts by mass or more and 70 parts by mass or less, and more preferably 20 parts by mass or more and 50 parts by mass or less with respect to the coating layer.

The equivalent circle diameter of the inorganic fine particles B is not particularly limited and can be appropriately selected according to a purpose, but is preferably 400 nm or more and 900 nm or less, and more preferably 600 nm or more and 900 nm or less from the viewpoint of obtaining more excellent charging stability. When the equivalent circle diameter is 400 nm or more, the inorganic fine particles B are present in the coating layer while protruding from the surface of the coating layer in a protrusion shape, and the chargeability with the toner can be ensured. When the equivalent circle diameter is 900 nm or less, the size of the equivalent circle diameter of the inorganic fine particles B with respect to the thickness of the coating layer is selected so that the inorganic fine particles B can be sufficiently retained in the resin, and thus, the inorganic fine particles B do not easily detach from the coating layer.

A method of measuring the equivalent circle diameter is not particularly limited and can be appropriately selected according to a purpose. For example, the equivalent circle diameter of the inorganic fine particles B may be measured by a method similar to the method of measuring the equivalent circle diameter of the antimony-containing particles.

The average thickness of the coating layer is not particularly limited and can be appropriately selected according to a purpose. However, the average thickness of the coating layer is preferably 0.50 μm or more, and more preferably 0.50 μm or more and 1.00 μm or less. When the average thickness of the coating layer is 0.50 μm or more, the coating layer does not have defective portions and can sufficiently retain the antimony-containing particles, the inorganic fine particles, and the like.

As an example of a method for measuring the average thickness of the coating layer, a transmission electron microscope (TEM) may be used to observe a carrier cross section, measure the thickness of a resin part of the coating layer covering the carrier surface, and determine an average value of the measured values. The thickness of the resin part of the coating layer on the antimony-containing particles and the inorganic fine particles B is not included in the measurement. The carrier cross section is measured at any 50 locations and an average value of the measured values is determined to obtain a thickness h (μm).

<Core Particles>

The core particles are coated with the coating layer.

The core particles are not particularly limited and may be appropriately selected according to a purpose, as long as the core particles are magnetic. Examples of the core particles include, but are not limited to, ferromagnetic metals such as iron and cobalt, iron oxides such as magnetite, hematite, and ferrite, and resin particles obtained by dispersing magnetic substances such as various types of alloys and compounds in a resin. Among these materials, ferrite is preferable from the viewpoint of conservation of the environment.

The type of ferrite is not particularly limited, may be appropriately selected according to a purpose, and examples thereof include Mn ferrite, Mn—Mg ferrite, and Mn—Mg—Sr ferrite. Among these types of ferrite, Mn ferrite is preferable, because Mn ferrite has a relatively high magnetization, so that the magnetic moment per carrier grain can be easily optimized, and carrier adhesion and the generation of ghost images can be more reliably prevented.

The volume average particle diameter of the core material is not particularly limited and may be appropriately selected according to a purpose, but is preferably 10 μm or more and 100 μm or less, and more preferably 30 μm or more and 50 μm or less.

The BET specific surface area of the core particles is not particularly limited and can be appropriately selected according to a purpose. However, the BET specific surface area of the core particles is preferably 0.01 $m^2/g$ or more and 0.50 $m^2/g$ or less, more preferably 0.03 $m^2/g$ or more and 0.35 $m^2/g$ or less, and particularly preferably 0.05 $m^2/g$ or more and 0.25 $m^2/g$ or less.

The apparent density of the core particles is not particularly limited and can be appropriately selected according to a purpose, but is preferably 2.1 $g/cm^3$ or more and 2.6 $g/cm^3$ or less, and more preferably 2.2 $g/cm^3$ or more and 2.5 $g/cm^3$ or less. When the apparent density is 2.1 $g/cm^3$ or more and 2.6 $g/cm^3$ or less, it is possible to obtain an electrophotographic image forming carrier having an apparent density of 2.0 $g/cm^3$ or more and 2.5 $g/cm^3$ or less.

A method of measuring the apparent density of the core particles is not particularly limited and can be appropriately selected according to a purpose. For example, similarly to the measurement of the apparent density of the electrophotographic image forming carrier, the apparent density of the core particles may be measured in accordance with JIS-Z2504.

The volume average particle diameter of the electrophotographic image forming carrier is not particularly limited and may be appropriately selected according to a purpose. However, the volume average particle diameter is preferably 20 μm or more and 100 μm or less, and more preferably 20 μm or more and 60 μm or less, because such a carrier can be used more suitably for the high image quality of recent years. If the volume average particle diameter is 20 μm or more, carrier adhesion can be prevented. If the volume average particle diameter is 100 μm or less, finer images can be formed without a decrease in the reproducibility of fine parts in the image.

A method of measuring the volume average particle diameter is not particularly limited and may be appropriately selected according to a purpose. For example, the volume average particle diameter may be measured by using a particle size distribution analyzer MICROTRAC (model HRA9320-X100) or SRA type (manufactured by Nikkiso Co., Ltd.).

(Method of Manufacturing Electrophotographic Image Forming Carrier)

A method of manufacturing the electrophotographic image forming carrier is not particularly limited and may be appropriately selected according to a purpose. For example, a known method may be used to manufacture the electrophotographic image forming carrier.

Specifically, the antimony-containing particles, the resin, the coupling agent, the inorganic fine particles B, an organic solvent, and, if desired, other components are mixed and dispersed for 10 minutes by using a homomixer or the like, to prepare a coating layer forming liquid (may be referred to as "coating liquid" hereinafter). After that, the coating layer forming liquid is applied to a surface of the core particles. The core particles to which the coating layer forming liquid is applied are fired, cooled, and then pulverized by using a sieve with an opening of 100 μm to obtain the electrophotographic image forming carrier.

The organic solvent is not particularly limited and may be appropriately selected according to a purpose. Examples of the organic solvent include, but are not limited to, toluene, xylene, methyl ethyl ketone, methyl isobutyl ketone, cellosolve, butyl acetate, and synthetic isoparaffin-based hydrocarbons. These organic solvents may be used alone or in combination of two or more types. Among these organic solvents, toluene is preferred.

The content of the organic solvent is not particularly limited and can be appropriately selected according to a purpose. However, the content of the organic solvent is preferably 4,000 parts by mass or more and 9,000 parts by mass or less with respect to the total mass of the coating layer forming liquid.

A method of applying the coating layer forming liquid is not particularly limited and may be appropriately selected according to a purpose. Examples of the method include, but are not limited to, an immersion method, a spraying method, and a brush coating method.

For example, the coating layer forming liquid can be applied by using SPIRACOATER SP-40 (manufactured by Okada Seiko Co., Ltd.) under the conditions of 30 g/min in an atmosphere of 60° C.

A firing method is not particularly limited and may be appropriately selected according to a purpose. For example, the firing method may include external heating or internal heating. Examples of devices used in the firing method include, but are not limited to, stationary electric furnaces, fluid-type electric furnaces, rotary electric furnaces, burner furnaces, and instruments using microwaves.

In the firing method, a sample may be kept in an electric furnace at 230° C. during 1 hour to be fired, for example.

(Electrophotographic Image Forming Developer)

The electrophotographic image forming developer according to an embodiment of the present invention contains the electrophotographic image forming carrier according to an embodiment of the present invention, a toner, and further contains other components, if desired.

(Toner)

The toner is not particularly limited and may be appropriately selected according to a purpose. The toner preferably contains a binder resin and a colorant, and may contain other components, if desired.

The binder resin is not particularly limited and may be appropriately selected according to a purpose. Examples of the binder resin include, but are not limited to, homopolymers of styrene and substituted products thereof such as polystyrene, poly-p-styrene, and polyvinyltoluene, styrene-based copolymers such as styrene-p-chlorostyrene copolymer, styrene-propylene copolymer, styrene-vinyl toluene copolymer, styrene-methyl acrylate copolymer, styrene-ethyl acrylate copolymer, styrene-methacrylic acid copolymer, styrene-methyl methacrylate copolymer, styrene-ethyl methacrylate copolymer, styrene-butyl methacrylate copolymer, styrene-α-methyl chloromethacrylate copolymer, styrene-acrylonitrile copolymer, styrene-methyl vinyl ether copolymer, styrene-methyl vinyl ketone copolymer, styrene-butadiene copolymer, styrene-isoprene copolymer, and styrene-maleic acid ester copolymer, polymethyl methacrylate, polybutyl methacrylate, polyvinyl chloride, polyvinyl acetate, polyethylene, polyester, polyurethane, epoxy resins, polyvinyl butyral, polyacrylic acid, rosin, modified rosin, terpene resins, phenol resins, aliphatic or aromatic hydrocarbon resins, and aromatic petroleum resins. These binder resins may be used alone or in combination of two or more types.

A binder resin used in pressure fixing is not particularly limited and may be appropriately selected according to a purpose. Examples of the binder resin used in pressure fixing include, but are not limited to, polyolefins such as polyethylene having low molecular weight and polypropylene having low molecular weight; olefin copolymers such as ethylene-acrylic acid copolymer, ethylene-acrylic acid ester copolymer, styrene-methacrylic acid copolymer, ethylene-methacrylic acid ester copolymer, ethylene-vinyl chloride copolymer, ethylene-vinyl acetate copolymer, and ionomer resins; epoxy resins, polyester, styrene-butadiene copolymers, polyvinylpyrrolidone, methyl vinyl ether-maleic anhydride copolymer, maleic acid-modified phenol resins, and phenol-modified terpene resins. These binder resins may be used alone or in combination of two or more types.

The colorant is not particularly limited and may be appropriately selected according to a purpose. Examples of the colorant include, but are not limited to, yellow pigments such as Cadmium Yellow, Mineral Fast Yellow, Nickel Titanium Yellow, Naples Yellow, Naphthol Yellow S, Hansa Yellow G, Hansa Yellow 10G, Benzidine Yellow GR, Quinoline Yellow Lake, Permanent Yellow NCG, and Tartrazine Lake; orange pigments such as Molybdenum Orange, Permanent Orange GTR, Pyrazolone Orange, Vulcan Orange, Indanthrene Brilliant Orange RK, Benzidine Orange G, and Indanthrene Brilliant Orange GK; red pigments such as Bengara, Cadmium Red, Permanent Red 4R, Lithol Red, Pyrazolone Red, Watching Red calcium salt, Lake Red D, Brilliant Carmine 6B, Eosin Lake, Rhodamine Lake B, Alizarin Lake, and Brilliant Carmine 3B; violet pigments such as Fast Violet B and Methyl Violet Lake; blue pigments such as Cobalt Blue, Alkali Blue, Victoria Blue Lake, Phthalocyanine Blue, metal-free Phthalocyanine Blue, partially chlorinated products of Phthalocyanine Blue, Fast Sky Blue, and Indanthrene Blue BC; green pigments such as Chrome Green, chromium oxide, Pigment Green B, and Malachite Green Lake; azine-based dyes such as Carbon Black, Oil Furnace Black, Channel Black, Lamp Black, Acetylene Black, and Aniline Black; black pigments such as metal salt azo dyes, metal oxides, and composite metal oxides, and white pigments such as titanium oxide. These colorants may be used alone or in combination of two or more types. Also, in the case of a transparent toner, the colorant may not be used.

The other components are not particularly limited and may be appropriately selected according to a purpose. Examples of the other components include, but are not limited to, release agents, charge control agents, and external additives.

The release agent is not particularly limited and may be appropriately selected according to a purpose. Examples of the release agent include, but are not limited to, polyolefins such as polyethylene and polypropylene, fatty acid metal salts, fatty acid esters, paraffin wax, amide-based wax, polyvalent alcohol wax, silicone varnish, carnauba wax, and ester wax. These release agents may be used alone or in combination of two or more types.

The charge control agent is not particularly limited, and may be appropriately selected according to a purpose. Examples of the charge control agent include, but are not limited to nigrosine; azine-based dyes including an alkyl group having 2 to 16 carbon atoms; basic dyes such as C.I. Basic Yellow 2 (C.I. 41000), C.I. Basic Yellow 3, C.I. Basic Red 1 (C.I. 45160), C.I. Basic Red 9 (C.I. 42500), C.I. Basic Violet 1 (C.I. 42535), C.I. Basic Violet 3 (C.I. 42555), C.I. Basic Violet 10 (C.I. 45170), C.I. Basic Violet 14 (C.I. 42510), C.I. Basic Blue 1 (C.I. 42025), C.I. Basic Blue 3 (C.I. 51005), C.I. Basic Blue 5 (C.I. 42140), C.I. Basic Blue 7 (C.I. 42595), C.I. Basic Blue 9 (C.I. 52015), C.I. Basic Blue 24 (C.I. 52030), C.I. Basic Blue 25 (C.I. 52025), C.I. Basic Blue 26 (C.I. 44045), C.I. Basic Green 1 (C.I. 42040), and C.I. Basic Green 4 (C.I. 42000); Lake pigments of these basic dyes; quaternary ammonium salts such as C.I. Solvent Black 8 (C.I. 26150), benzoylmethylhexadecylammonium chloride, and decyltrimethyl chloride; dialkyl (e.g., dibutyl, dioctyl) tin compounds; dialkyl tin borate compounds; guanidine derivatives; polyamine resins such as vinyl polymers having an amino group and condensed polymers having an amino group; metal complex salts of monoazo dyes; metal complexes of salicylic acid, dialkyl salicylic acid, naphthoic acid, and dicarboxylic acid with Zn, Al, Co, Cr, and Fe; sulfonated copper phthalocyanine pigments; organic boron salts; fluorine-containing quaternary ammonium salts; and calixarene-based compounds. These charge control agents may be used alone or in combination of two or more types.

The external additive is not particularly limited and may be appropriately selected according to a purpose. Examples of the external additive include, but are not limited to, inorganic particles such as silica, titanium oxide, alumina, silicon carbide, silicon nitride, and boron nitride; and resin particles such as polymethyl methacrylate particles and polystyrene particles having an average particle diameter of 0.05 μm or more and 1 μm or less, obtainable by soap-free emulsion polymerization. These external additives may be used alone or in combination of two or more types.

(Process Cartridge)

In a process cartridge according to an embodiment the present invention, an electrostatic latent image bearer is integrally supported together with means that use a developer containing the above-described electrophotographic image forming carrier according to an embodiment of the present invention and toner, to develop an electrostatic latent image formed on the electrostatic latent image bearer.

A process cartridge according to an embodiment of the present invention will be described with reference to FIG. 1.

As illustrated in FIG. 1, a process cartridge 10 includes an electrostatic latent image bearer 11, a charging device 12 that charges the electrostatic latent image bearer 11, a developing device 13 that develops an electrostatic latent image formed on the electrostatic latent image bearer 11 with the developer according to an embodiment of the present invention to form a toner image, and a cleaning device 14 that removes residual toner remaining on the electrostatic latent image bearer 11 after the toner image formed on the electrostatic latent image bearer 11 is transferred onto a recording medium. The process cartridge 10 is attachable to and detachable from a main body of an image forming apparatus such as a copier and a printer.

(Electrophotographic Image Forming Method and Electrophotographic Image Forming Apparatus)

An electrophotographic image forming method according to an embodiment of the present invention includes an electrostatic latent image forming step, a toner image forming step, a transfer step, a fixing step, and includes other steps, if desired.

The electrophotographic image forming apparatus according to an embodiment of the present invention includes electrostatic latent image forming device, toner image forming device, transfer device, fixing device, and includes other devices, if desired.

The electrostatic latent image forming step is a step of forming an electrostatic latent image on an electrostatic latent image bearer, and may be performed by the electrostatic latent image forming device.

The toner image forming step is a step of developing the electrostatic latent image by using the electrophotographic image forming developer to form a toner image, and may be performed by the toner image forming device.

The toner image forming device are not particularly limited and may be appropriately selected according to a purpose. However, it is preferable to use means for developing and forming a toner image by using a developer in which a magnetic brush is formed.

The transfer step is a step of transferring the toner image onto a recording medium, and may be performed by the transfer device.

The fixing step is a step of fixing the toner image transferred onto the recording medium, to form an image, and is performed by the fixing device.

The other steps are not particularly limited and may be appropriately selected according to a purpose. Examples of the other steps include, but are not limited to, a static elimination step, a cleaning step, a recycling step, and a control step.

The other devices are not particularly limited and may be appropriately selected according to a purpose. Examples of the other means include, but are not limited to, static elimination device, cleaning device, recycling device, and control device.

Figure 2:
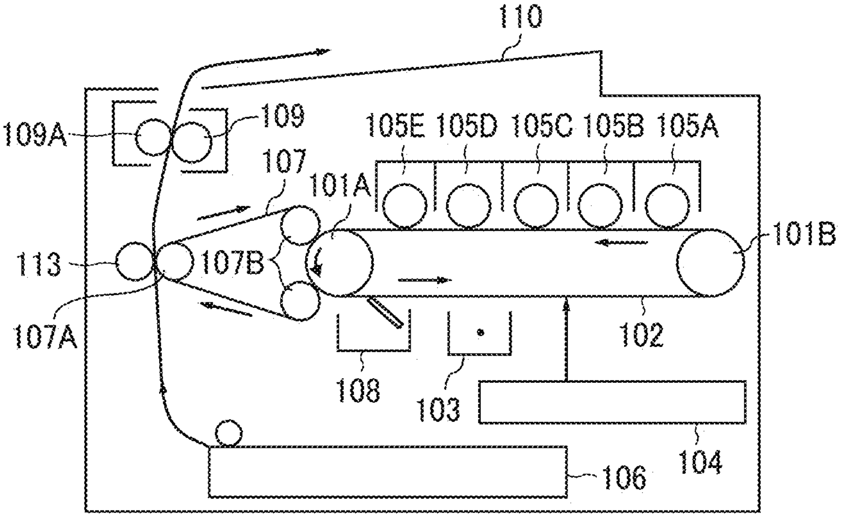
FIG. 2 is a diagram illustrating an electrophotographic image forming apparatus according to an embodiment of the present invention.

FIG. 2 is a diagram illustrating an electrophotographic image forming apparatus according to an embodiment of the present invention.

The image forming apparatus illustrated in FIG. 2 includes a drive roller 101A, a driven roller 101B, a photoconductor belt 102 serving as an electrostatic latent image bearer, a charger 103, a laser writing unit 104, developing units 105A to 105D respectively containing yellow, magenta, cyan, and black toners, a sheet tray 106, an intermediate transfer belt 107, a drive shaft roller 107A for driving the intermediate transfer belt 107, a pair of driven shaft rollers 107B for supporting the intermediate transfer belt 107, a cleaner 108, a fixing roller 109, a pressure roller 109A, a sheet ejection tray 110, and a sheet transfer roller 113.

The intermediate transfer belt 107 has flexibility. The intermediate transfer belt 107 is stretched taut with the drive shaft roller 107A and the pair of driven shaft rollers 107B and circulatingly conveyed clockwise in FIG. 2. A part of the surface of the intermediate transfer belt 107 stretched between the driven shaft rollers 107B contacts the photoconductor belt 102, wound around the outer periphery of the drive roller 101A, in a horizontal direction.

In a regular full-color image forming operation, each time a toner image is formed on the photoconductor belt 102, the toner image is immediately transferred onto the intermediate transfer belt 107 to form a full-color composite toner image. The full-color composite toner image is transferred onto a transfer sheet that is fed from the sheet tray 106 by the sheet transfer roller 113. The transfer sheet having the composite toner image thereon is conveyed to between the fixing roller 109 and the pressure roller 109A in a fixing device. After the composite toner image is fixed on the transfer sheet by the fixing roller 109 and the pressure roller 109A, the transfer sheet is ejected on the sheet ejection tray 110.

As the developing units 105A to 105D develop images with respective toners, the toner concentration in each developer contained in each developing unit is decreased. A decrease of toner concentration in the developer is detected by a toner concentration sensor. As a decrease of toner concentration is detected, developer supply devices connected to respective developing units start operation to supply developer containing toner to increase toner concentration. At this time, the toner in the developer to be supplied is the same color as the toner accommodated in the corresponding developing unit.

In FIG. 2, toner images are superposed on the intermediate transfer belt to form an image. According to another embodiment, the electrophotographic image forming apparatus may employ a system in which toner images are directly transferred from a transfer drum onto a recording medium without using an intermediate transfer belt.

EXAMPLES

The present invention will be described in more detail below with reference to examples and comparative examples, but the present invention is not limited to these examples and comparative examples. In the following description, "parts" refers to "parts by mass" and "%" refers to "mass %".

Manufacturing Example 1 of Electrophotographic Image Forming Carrier 200 parts by mass of an acrylic resin solution (solid content concentration: 20 mass %) and 2,000 parts by mass of a silicone resin solution (trade name: SR2410, Dow Toray Co., Ltd., solid content concentration: 40 mass %) as resins, 35 parts by mass of aminosilane (trade name: SH6020, Dow Toray Co., Ltd., solid content concentration: 100 mass %) as a coupling agent, 700 parts by mass of aluminum oxide surface-treated with diantimony pentoxide-doped tin oxide (antimony: diantimony pentoxide, inorganic fine particles A: aluminum oxide, equivalent circle diameter: 0.55 μm) as antimony-containing particles, 570 parts by mass of barium sulfate (equivalent circle diameter: 0.60 μm) as inorganic fine particles B, and 6,000 parts by mass of toluene as an organic solvent were mixed and dispersed for 10 minutes by using a homomixer to obtain a coating layer forming liquid.

A SPIRACOATER SP-40 (manufactured by Okada Seiko Co., Ltd.) was used to coat the surface of Mn ferrite (volume average particle diameter: 36 μm, apparent density: 2.4 g/cm$^3$) as core particles with the coating layer forming liquid under the conditions of 30 g/min in an atmosphere of 60° C. and the coated surface was dried, to form a coating layer on the surface of the core particles.

The core particles on which the coating layer was formed were placed in an electric furnace at 230° C. for 1 hour to be fired, and were then cooled. After cooling, the core particles were pulverized by using a sieve with an opening of 100 μm to obtain an electrophotographic image forming carrier 1. The content of the antimony-containing particles was 20 parts by mass with respect to 100 parts by mass of the coating layer.

The apparent density of the obtained electrophotographic image forming carrier 1 was measured in accordance with JIS-Z2504 and determined as 2.3 g/cm$^3$. Furthermore, the average thickness of the coating layer was measured by the following method and determined as 0.50 μm.

<Average Thickness of Electrophotographic Image Forming Carrier>

To determine the average thickness of the coating layer, a cross section of the electrophotographic image forming carrier was observed with a transmission electron microscope (TEM), a thickness T from the surface of the core particles to the surface of the coating layer was measured at 50 points along the carrier surface at intervals of 0.2 μm, and an average value of the obtained measurement values was calculated.

The apparent density and the volume average particle diameter of the core particles, the equivalent circle diameter of the antimony-containing particles, the equivalent circle diameter of the inorganic fine particles B, and the like were measured by the following methods.

<Apparent Density of Core Particles>

The apparent density of the core particles was measured in accordance with JIS-Z2504, similarly to the apparent density of the electrophotographic image forming carrier.

<Volume Average Particle Diameter of Core Particles>

The volume average particle diameter of the core particles was measured by using an SRA type MICROTRAC particle size distribution analyzer (manufactured by Nikkiso Co., Ltd.) in a measurement range from 0.7 μm to 125 μm.

<Equivalent Circle Diameter of Antimony-Containing Particles and Inorganic Fine Particles B>

The equivalent circle diameters of the antimony-containing particles and the inorganic fine particles B were measured by a NANOTRAC UPA series (manufactured by Nikkiso Co., Ltd.) using the antimony-containing particles and the inorganic fine particles B before forming the electrophotographic image forming carrier.

Manufacturing Example 2 of Electrophotographic Image Forming Carrier

An electrophotographic image forming carrier 2 was obtained similarly to Manufacturing Example 1, except that the "aluminum oxide surface-treated with diantimony pentoxide-doped tin oxide" used as the antimony-containing particles in Manufacturing Example 1 was changed to "aluminum oxide surface-treated with diantimony trioxide-doped tin oxide (antimony: diantimony trioxide, inorganic fine particles A: aluminum oxide, equivalent circle diameter: 0.55 μm)".

Physical property values of the obtained electrophotographic image forming carrier 2 were measured by a similar method as for the electrophotographic image forming carrier 1. The apparent density of the electrophotographic image forming carrier 2 was 2.3 g/cm$^3$ and the average thickness of the coating layer was 0.50 μm.

Manufacturing Example 3 of Electrophotographic Image Forming Carrier

An electrophotographic image forming carrier 3 was obtained similarly to Manufacturing Example 1, except that the "Mn ferrite (volume average particle diameter: 36 μm, apparent density: 2.4 g/cm$^3$)" used as the core particles in Manufacturing Example 1 was changed to "Mn ferrite (volume average particle diameter: 36 μm, apparent density: 2.6 g/cm$^3$)".

Physical property values of the obtained electrophotographic image forming carrier 3 were measured by a similar method as for the electrophotographic image forming carrier 1. The apparent density of the electrophotographic image forming carrier 3 was 2.5 g/cm$^3$ and the average thickness of the coating layer was 0.50 μm.

Manufacturing Example 4 of Electrophotographic Image Forming Carrier

An electrophotographic image forming carrier 4 was obtained similarly to Manufacturing Example 1, except that the "Mn ferrite (volume average particle diameter: 36 μm, apparent density: 2.4 g/cm$^3$)" used as the core particles in Manufacturing Example 1 was changed to "Mn ferrite (volume average particle diameter: 36 μm, apparent density: 2.1 g/cm$^3$)".

Physical property values of the obtained electrophotographic image forming carrier 4 were measured by a similar method as for the electrophotographic image forming carrier 1. The apparent density of the electrophotographic image forming carrier 4 was 2.0 g/cm$^3$ and the average thickness of the coating layer was 0.50 μm.

Manufacturing Example 5 of Electrophotographic Image Forming Carrier

An electrophotographic image forming carrier 5 was obtained similarly to Manufacturing Example 1, except that the "aluminum oxide surface-treated with diantimony pentoxide-doped tin oxide" used as the antimony-containing particles in Manufacturing Example 1 was changed to "titanium oxide surface-treated with diantimony pentoxide-doped tin oxide (antimony: diantimony pentoxide, inorganic fine particles A: titanium oxide, equivalent circle diameter: 0.55 μm)".

Physical property values of the obtained electrophotographic image forming carrier 5 were measured by a similar method as for the electrophotographic image forming carrier 1. The apparent density of the electrophotographic image forming carrier 5 was 2.3 g/cm$^3$ and the average thickness of the coating layer was 0.50 μm.

Manufacturing Example 6 of Electrophotographic Image Forming Carrier

An electrophotographic image forming carrier 6 was obtained similarly to Manufacturing Example 1, except that the "Mn ferrite (volume average particle diameter: 36 μm, apparent density: 2.4 g/cm$^3$)" used as the core particles in Manufacturing Example 1 was changed to "Mn—Mg ferrite (volume average particle diameter: 36 μm, apparent density: 2.4 g/cm$^3$)".

Physical property values of the obtained electrophotographic image forming carrier 6 were measured by a similar method as for the electrophotographic image forming carrier 1. The apparent density of the electrophotographic image forming carrier 6 was 2.3 g/cm$^3$ and the average thickness of the coating layer was 0.50 μm.

Manufacturing Example 7 of Electrophotographic Image Forming Carrier

An electrophotographic image forming carrier 7 was obtained similarly to Manufacturing Example 1, except that the "barium sulfate" used as the inorganic fine particles B in Manufacturing Example 1 was not used.

Physical property values of the obtained electrophotographic image forming carrier 7 were measured by a similar method as for the electrophotographic image forming carrier 1. The apparent density of the electrophotographic image forming carrier 7 was 2.3 g/cm$^3$ and the average thickness of the coating layer was 0.50 μm.

Manufacturing Example 8 of Electrophotographic Image Forming Carrier

An electrophotographic image forming carrier 8 was obtained similarly to Manufacturing Example 1, except that the "barium sulfate" used as the inorganic fine particles B in Manufacturing Example 1 was changed to "magnesium oxide".

Physical property values of the obtained electrophotographic image forming carrier 8 were measured by a similar method as for the electrophotographic image forming carrier 1. The apparent density of the electrophotographic image forming carrier 8 was 2.3 g/cm$^3$ and the average thickness of the coating layer was 0.50 μm.

Manufacturing Example 9 of Electrophotographic Image Forming Carrier

An electrophotographic image forming carrier 9 was obtained similarly to Manufacturing Example 1, except that the "barium sulfate" used as the inorganic fine particles B in Manufacturing Example 1 was changed to "hydrotalcite".

Physical property values of the obtained electrophotographic image forming carrier 9 were measured by a similar method as for the electrophotographic image forming carrier 1. The apparent density of the electrophotographic image forming carrier 9 was 2.3 g/cm$^3$ and the average thickness of the coating layer was 0.50 μm.

Manufacturing Example 10 of Electrophotographic Image Forming Carrier

An electrophotographic image forming carrier 10 was obtained similarly to Manufacturing Example 1, except that the "barium sulfate" used as the inorganic fine particles B in Manufacturing Example 1 was changed to "magnesium hydroxide".

Physical property values of the obtained electrophotographic image forming carrier 10 were measured by a similar method as for the electrophotographic image forming carrier 1. The apparent density of the electrophotographic image forming carrier 10 was 2.3 g/cm$^3$ and the average thickness of the coating layer was 0.50 μm.

Manufacturing Example 11 of Electrophotographic Image Forming Carrier

An electrophotographic image forming carrier 11 was obtained similarly to Manufacturing Example 1, except that the "barium sulfate" used as the inorganic fine particles B in Manufacturing Example 1 was changed to "aluminum oxide".

Physical property values of the obtained electrophotographic image forming carrier 11 were measured by a similar method as for the electrophotographic image forming carrier 1. The apparent density of the electrophotographic image forming carrier 11 was 2.3 g/cm$^3$ and the average thickness of the coating layer was 0.50 μm.

Manufacturing Example 12 of Electrophotographic Image Forming Carrier

An electrophotographic image forming carrier 12 was obtained similarly to Manufacturing Example 1, except that the "200 parts by mass of an acrylic resin" and the "2,000 parts by mass of a silicone resin" used as the resin in Manufacturing Example 1 were changed to "2,200 parts by mass of a phenol resin".

Physical property values of the obtained electrophotographic image forming carrier 12 were measured by a similar method as for the electrophotographic image forming carrier 1. The apparent density of the electrophotographic image forming carrier 12 was 2.3 g/cm$^3$ and the average thickness of the coating layer was 0.50 μm.

Manufacturing Example 13 of Electrophotographic Image Forming Carrier

An electrophotographic image forming carrier 13 was obtained similarly to Manufacturing Example 1, except that the content of the "aluminum oxide surface-treated with diantimony pentoxide-doped tin oxide" used as the antimony-containing particles in Manufacturing Example 1 was changed from "700 parts by mass" to "1,460 parts by mass".

Physical property values of the obtained electrophotographic image forming carrier 13 were measured by a similar method as for the electrophotographic image forming carrier 1. The apparent density of the electrophotographic image forming carrier 13 was 2.3 g/cm$^3$ and the average thickness of the coating layer was 0.50 μm.

Manufacturing Example 14 of Electrophotographic Image Forming Carrier

An electrophotographic image forming carrier 14 was obtained similarly to Manufacturing Example 1, except that the "aluminum oxide surface-treated with diantimony pentoxide-doped tin oxide" used as the antimony-containing particles in Manufacturing Example 1 was changed to "diantimony pentoxide-doped tin oxide (antimony: diantimony pentoxide, inorganic fine particles A: not contained, equivalent circle diameter: 0.55 μm)".

Physical property values of the obtained electrophotographic image forming carrier 14 were measured by a similar method as for the electrophotographic image forming carrier 1. The apparent density of the electrophotographic image forming carrier 14 was 2.3 g/cm$^3$ and the average thickness of the coating layer was 0.50 μm.

Manufacturing Example 15 of Electrophotographic Image Forming Carrier

An electrophotographic image forming carrier 15 was obtained similarly to Manufacturing Example 1, except that the "Mn ferrite (volume average particle diameter: 36 μm, apparent density: 2.4 g/cm$^3$)" used as the core particles in Manufacturing Example 1 was changed to "Mn ferrite (volume average particle diameter: 36 μm, apparent density: 2.7 g/cm$^3$)".

Physical property values of the obtained electrophotographic image forming carrier 15 were measured by a similar method as for the electrophotographic image forming carrier 1. The apparent density of the electrophotographic image forming carrier 15 was 2.6 g/cm$^3$ and the average thickness of the coating layer was 0.50 μm.

Manufacturing Example 16 of Electrophotographic Image Forming Carrier

An electrophotographic image forming carrier 16 was obtained similarly to Manufacturing Example 1, except that the "Mn ferrite (volume average particle diameter: 36 μm, apparent density: 2.4 g/cm$^3$)" used as the core particles in Manufacturing Example 1 was changed to "Mn ferrite (volume average particle diameter: 36 μm, apparent density: 2.0 g/cm$^3$)".

Physical property values of the obtained electrophotographic image forming carrier 16 were measured by a similar method as for the electrophotographic image forming carrier 1. The apparent density of the electrophotographic image forming carrier 16 was 1.9 g/cm$^3$ and the average thickness of the coating layer was 0.50 μm.

Manufacturing Example 17 of Electrophotographic Image Forming Carrier

An electrophotographic image forming carrier 17 was obtained similarly to Manufacturing Example 1, except that the "aluminum oxide surface-treated with diantimony pentoxide-doped tin oxide" used as the antimony-containing particles in Manufacturing Example 1 was changed to "indium oxide surface-treated with diantimony pentoxide-doped tin oxide (antimony: diantimony pentoxide, inorganic fine particles A: indium oxide, equivalent circle diameter: 0.55 μm)".

Physical property values of the obtained electrophotographic image forming carrier 17 were measured by a similar method as for the electrophotographic image forming carrier 1. The apparent density of the electrophotographic image forming carrier 17 was 2.3 g/cm$^3$ and the average thickness of the coating layer was 0.50 μm.

Manufacturing Example 18 of Electrophotographic Image Forming Carrier

An electrophotographic image forming carrier 18 was obtained similarly to Manufacturing Example 1, except that the "aluminum oxide surface-treated with diantimony pentoxide-doped tin oxide" used as the antimony-containing particles in Manufacturing Example 1 was changed to "indium tin oxide (antimony: not contained, inorganic fine particles A: not contained, equivalent circle diameter: 0.55 μm)".

Physical property values of the obtained electrophotographic image forming carrier 18 were measured by a similar method as for the electrophotographic image forming carrier 1. The apparent density of the electrophotographic image forming carrier 18 was 2.3 g/cm$^3$ and the average thickness of the coating layer was 0.50 μm.

Synthesis Example of Polyester Resin 65 parts by mass of an ethylene oxide 2-mol adduct of bisphenol A, 86 parts by mass of a propylene oxide 3-mol adduct of bisphenol A, 274 parts by mass of terephthalic acid, and 2 parts by mass of dibutyltin oxide were filled into a reaction vessel equipped with a condenser tube, a stirrer, and a nitrogen introduction tube, and the mixture was allowed to react at 230° C. under normal pressure for 15 hours. Subsequently, the mixture was allowed to react under reduced pressure from 5 mmHg to 10 mmHg during 6 hours to obtain a polyester resin.

The obtained polyester resin had a number average molecular weight (Mn) of 2,300, a weight average molecular weight (Mw) of 8,000, a glass transition temperature (Tg) of 58° C., an acid value of 25 mg KOH/g, and a hydroxyl value of 35 mg KOH/g.

Synthesis Example of Prepolymer 682 parts by mass of an ethylene oxide 2-mol adduct of bisphenol A, 81 parts by mass of a propylene oxide 2-mol adduct of bisphenol A, 283 parts by mass of terephthalic acid, 22 parts by mass of trimellitic anhydride, and 2 parts by mass of dibutyltin oxide were filled into a reaction vessel equipped with a condenser tube, a stirrer, and a nitrogen introduction tube, and the mixture was allowed to react at 230° C. under normal pressure for 8 hours. Subsequently, the mixture was allowed to react under reduced pressure from 10 mmHg to 15 mmHg during 5 hours to obtain an intermediate polyester resin.

The obtained intermediate polyester resin had a number average molecular weight (Mn) of 2,100, a weight average molecular weight (Mw) of 9,600, a glass transition temperature (Tg) of 55° C., an acid value of 0.5 mg KOH/g, and a hydroxyl value of 49 mg KOH/g.

411 parts by mass of the intermediate polyester resin, 89 parts by mass of isophorone diisocyanate, and 500 parts by mass of ethyl acetate were filled into a reaction vessel equipped with a condenser tube, a stirrer, and a nitrogen introduction tube, and the mixture was allowed to react at 100° C. for 5 hours to obtain a prepolymer.

The content of free isocyanate in the obtained prepolymer was 1.60 mass %, and the solid content concentration of the prepolymer (after standing at 150° C. for 45 minutes) was 50 mass %.

Synthesis Example of Ketimine Compound 30 parts by mass of isophorone diamine and 70 parts by mass of methyl ethyl ketone were filled into a reaction vessel equipped with a stirrer and a thermometer, and the mixture was allowed to react at 50° C. for 5 hours to obtain a ketimine compound. The obtained ketimine compound had an amine value of 423 mol/L.

Synthesis Example of Masterbatch 1,000 parts by mass of water, 540 parts by mass of carbon black PRINTEX 35 (manufactured by Degussa AG, DBP oil absorption amount: 42 mL/100 g, pH: 9.5), and 1,200 parts by mass of the polyester resin were mixed by using a HENSCHEL MIXER (manufactured by Mitsui Mining Co., Ltd.), to obtain a mixture.

Next, the obtained mixture was kneaded by a twin roll at 150° C. for 30 minutes, cooled by rolling, and pulverized by a pulverizer (manufactured by Hosokawa Micron Corp.), to obtain a masterbatch.

Synthesis Example of Aqueous Medium

An aqueous medium was prepared by dissolving 265 parts by mass of a 10 mass % suspension of tricalcium phosphate and 1.0 parts by mass of sodium dodecylbenzenesulfonate in 306 parts by mass of water by uniformly mixing and stirring the components.

Manufacturing Example of Toner

—Preparation of Toner Material Liquid—

70 parts by mass of the polyester resin, 10 parts by mass of the prepolymer, and 100 parts by mass of ethyl acetate were filled into a beaker and stirred to be dissolved. Subsequently, 5 parts by mass of a paraffin wax (HNP-9 manufactured by Nippon Seiro Co., Ltd., melting point: 75° C.) as a release agent, 2 parts by mass of MEK-ST (manufactured by Nissan Chemical Corporation), and 10 parts by mass of the masterbatch were added to the beaker. The mixture was subjected three times to a treatment by an ULTRAVISCOMILL bead mill (manufactured by AIMEX CO., LTD.) filled with 80 vol % of zirconia beads having a particle diameter of 0.5 mm, at a liquid feeding speed of 1 kg/hour and a peripheral speed of the disc of 6 m/sec. Afterwards, 2.7 parts by mass of the ketimine compound were added to dissolve the mixture and obtain a toner material liquid.

—Emulsification and Dispersion Step—

150 parts by mass of the aqueous medium were filled into a vessel and stirred by a TK-type HOMOMIXER (manufactured by Tokushu Kika Kogyo Co., Ltd.) at a revolution of 12,000 rpm. Subsequently, 100 parts by mass of the toner material liquid were added to the vessel and mixed for 10 minutes to obtain an emulsified slurry.

—Solvent Removal Step—

100 parts by mass of the obtained emulsified slurry were filled into a flask equipped with a stirrer and a thermometer and stirred at a peripheral stirring speed of 20 m/min at 30° C. for 12 hours to remove the solvent in the emulsified slurry.

—Washing Step—

After removing the solvent from the emulsified slurry, 100 parts by mass of the emulsified slurry were filtered under reduced pressure to obtain a filtered cake. The obtained filtered cake was mixed with 100 parts by mass of ion-exchanged water by using a TK-type HOMOMIXER at a revolution of 12,000 rpm for 10 minutes and then, the obtained mixture was filtered. This operation was performed two more times.

Afterwards, the obtained filtered cake was mixed with 20 parts by mass of a 10 mass % aqueous solution of sodium hydroxide by using a TK-type HOMOMIXER at a revolution of 12,000 rpm for 30 minutes and then, the obtained mixture was filtered under reduced pressure.

Subsequently, 300 parts by mass of ion-exchanged water were added to the obtained filtered cake and the obtained mixture was mixed by using a TK-type HOMOMIXER at a revolution of 12,000 rpm for 10 minutes, followed by filtration. This operation was performed two more times.

Further, the obtained filtered cake was mixed with 20 parts by mass of 10 mass % hydrochloric acid by using a TK-type HOMOMIXER at a revolution of 12,000 rpm for 10 minutes. Subsequently, the mixture was filtered to obtain a washed filtered cake.

—Surfactant Amount Preparation Step—

The washed filtered cake was mixed with 300 parts by mass of ion-exchanged water by using a TK-type HOMOMIXER at a revolution of 12,000 rpm for 10 minutes to prepare a toner dispersion liquid. The electric conductivity of the toner dispersion liquid was measured, and the surfactant concentration of the toner dispersion liquid was calculated from a surfactant concentration calibration curve created in advance. Based on this value, ion-exchanged water was added so that the surfactant concentration reached a target surfactant concentration of 0.05 mass %, and a toner dispersion liquid was obtained.

—Surface Treatment Step—

The obtained toner dispersion liquid was heated in a water bath at a heating temperature T1 of 55° C. for 10 hours while being stirred at a revolution of 5,000 rpm by a TK-type HOMOMIXER. After that, the toner dispersion liquid was cooled to 25° C. and filtered. Further, the obtained filtered cake was mixed with 300 parts by mass of ion-exchanged water by using a TK-type HOMOMIXER at a revolution of 12,000 rpm for 10 minutes and then, the obtained mixture was filtered to obtain a final filtered cake.

—Drying Step—

The obtained final filtered cake was dried by a circulating air dryer at 45° C. for 48 hours and then, sieved through a mesh having an opening of 75 μm to obtain toner mother particles.

—External Addition Step—

100 parts by mass of the obtained toner mother particles were mixed with 3.0 parts by mass of hydrophobic silica having a volume average particle diameter of 100 nm, 1.0 parts by mass of titanium oxide having a volume average particle diameter of 20 nm, and 1.5 parts by mass of hydrophobic silica having a volume average particle diameter of 15 nm by using a HENSCHEL mixer, to obtain a toner.

Examples 1 to 13 and Comparative Examples 1 to 5

930 parts by mass of each of the electrophotographic image forming carriers 1 to 18 were mixed with 70 parts by mass of the toner (mass ratio of 93:7), and then, the mixture was stirred at 81 rpm for 5 minutes by using a TURBULA mixer, to obtain electrophotographic image forming developers 1 to 18 for evaluation.

In the obtained electrophotographic image forming developers 1 to 18 for evaluation, “toner scattering”, “image density (ID)”, “carrier adhesion (edge)”, “carrier adhesion (solid)”, “charge stability over time”, and “ghost image” were evaluated, based on the following evaluation criteria.

<Toner Scattering>

The electrophotographic image forming developers 1 to 18 for evaluation in Examples 1 to 13 and Comparative Examples 1 to 5 were placed in a digital full color multifunction peripheral (PRO C9100, manufactured by Ricoh Co., Ltd.). 1,000,000 sheets of an image of a character chart having an image area ratio of 5% (each character having a size of about 2 mm×2 mm) were output. Subsequently, the toner accumulated under a developer carrying body was collected and the weight (mg) of the toner was measured. “Toner scattering” was evaluated from the measured weight (mg) of the toner, based on the following evaluation criteria. "C" or better in the following evaluation criteria indicates that the product can be used in practice.

[Evaluation Criteria]

A: 0 mg or more and less than 50 mg

B: 50 mg or more and less than 100 mg

C: 100 mg or more and less than 250 mg

F: 250 mg or more

<Image Density (ID)>

The electrophotographic image forming developers 1 to 18 for evaluation in Examples 1 to 13 and Comparative Examples 1 to 5 were placed in a digital full color multi-function peripheral (PRO C9100, manufactured by Ricoh Co., Ltd.). 1,000,000 sheets of an image of a character chart having an image area ratio of 5% (each character having a size of about 2 mm×2 mm) were output in an evaluation environment room (10° C. and 15% low-temperature low-humidity environment). Subsequently, three sheets of each of a solid white image and a solid black image were printed (brand name: RICOH MyPaper, A3 paper), and the image density was visually evaluated. The "image density (ID)" was evaluated, based on the following evaluation criteria by comparing the image density visually with an image sample. "C" or better in the following evaluation criteria indicates that the product can be used in practice.

[Evaluation Criteria]

A: Image density is equivalent to image sample

B: Deterioration of image density is not recognizable from sheet alone, but in comparison with image sample C: Low image density is recognizable from close observation of sheet alone F: Low density is obvious <Carrier Adhesion (Edge)>

The electrophotographic image forming developers 1 to 18 for evaluation in Examples 1 to 13 and Comparative Examples 1 to 5 were placed in a digital full color multi-function peripheral (PRO C9100, manufactured by Ricoh Co., Ltd.). 1,000,000 sheets of an image of a character chart having an image area ratio of 5% (each character having a size of about 2 mm×2 mm) were output. Subsequently, the digital full color multifunction peripheral was placed in an evaluation environment room (10° C. and 15% low-temperature low-humidity environment) for one day. Afterwards, under development conditions including a charging potential (Vd) of −630 V and a development bias of DC −500 V, an image in which solid portions and white-paper portions were alternately arranged in a vertical and horizontal direction in a grid of 170 μm×170 μm squares, was output in A3 size. The number of squares in which white voids occurred in the image due to carrier adhesion at the boundary of each square was measured. The "carrier adhesion (edge)" was evaluated from the number of measured squares, based on the following evaluation criteria. "C" or better in the following evaluation criteria indicates that the product can be used in practice.

[Evaluation Criteria]

A: 0 squares

B: 1 or more and 3 or less squares

C: 4 or more and 10 or less squares

F: 11 or more squares

<Carrier Adhesion (Solid)>

The electrophotographic image forming developers 1 to 18 for evaluation in Examples 1 to 13 and Comparative Examples 1 to 5 were placed in a digital full color multi-function peripheral (PRO C9100, manufactured by Ricoh Co., Ltd.). 1,000,000 sheets of an image of a character chart having an image area ratio of 5% (each character having a size of about 2 mm×2 mm) were output. Subsequently, the sheets were placed in an evaluation environment room (10° C. and 15% low-temperature low-humidity environment), and under development conditions including a charging potential (Vd) of −600 V, a potential of −100 V after exposure of a portion corresponding to an image part (solid), and a development bias of DC −500 V, the power was turned off during image formation of the toner image to interrupt the image formation, and the number of carriers adhering to an area of 10 mm×100 mm of a photoconductor after transfer was measured. The "carrier adhesion (solid)" was evaluated from the measured number of carriers, based on the following evaluation criteria.

"C" or better in the following evaluation criteria indicates that the product can be used in practice.

[Evaluation Criteria]

A: 0 squares

B: 1 or more and 3 or less squares

C: 4 or more and 10 or less squares

F: 11 or more squares

<Charging Stability Over Time>

The electrophotographic image forming developers 1 to 18 for evaluation in Examples 1 to 13 and Comparative Examples 1 to 5 were placed in a digital full color multi-function peripheral (PRO C9100, manufactured by Ricoh Co., Ltd.). 1,000,000 sheets of an image having an image area ratio of 40% were output. Absolute values of a charge amount (Q1) before output and a charge amount (Q2) after output were calculated, based on the following formula (I), to determine a change rate of the charge amount. The charge amount (Q1) and the charge amount (Q2) are obtained as follows. The electrophotographic image forming carriers 1 to 18 are mixed with a toner 1 at a mass ratio of 93:7 and the obtained mixture is charged by triboelectric charging to obtain an electrophotographic image forming developer. The electrophotographic image forming developer is measured by using a blow-off device TB-200 (manufactured by Toshiba Chemical Co., Ltd.) to obtain the charge amount (Q1). Further, the charge amount (Q2) is a value obtained by using the blow-off device to measure the electrophotographic image forming carrier from which the toner 1 is removed. "C" or better in the following evaluation criteria indicates that the product can be used in practice.

$$[(Q1-Q2)/Q1]*100 \quad \text{Formula (I)}$$

[Evaluation Criteria]

A: 0% or more and less than 5%

B: 5% or more and less than 10%

C: 10% or more and less than 20%

F: 20% or more

<Ghost Image>

Figure 3A:
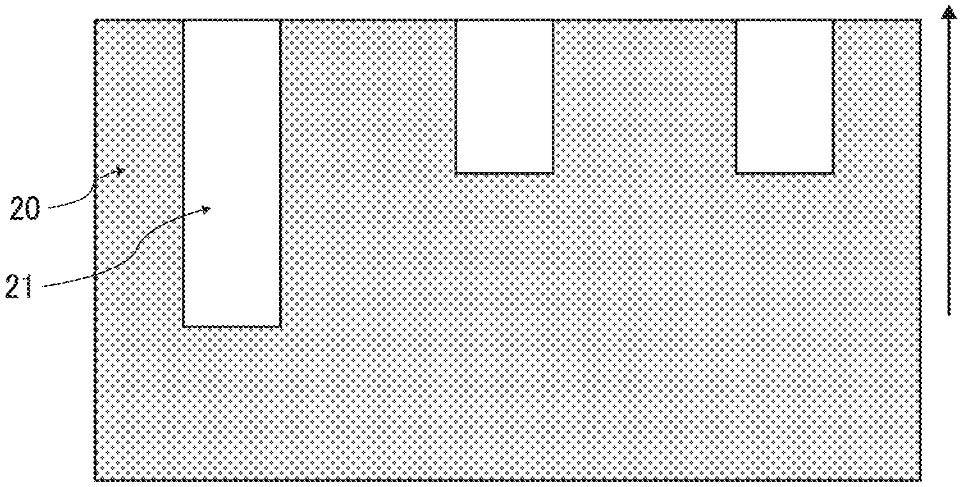
FIG. 3A is a schematic diagram illustrating a normal image in a vertical bar chart.
Figure 3B:
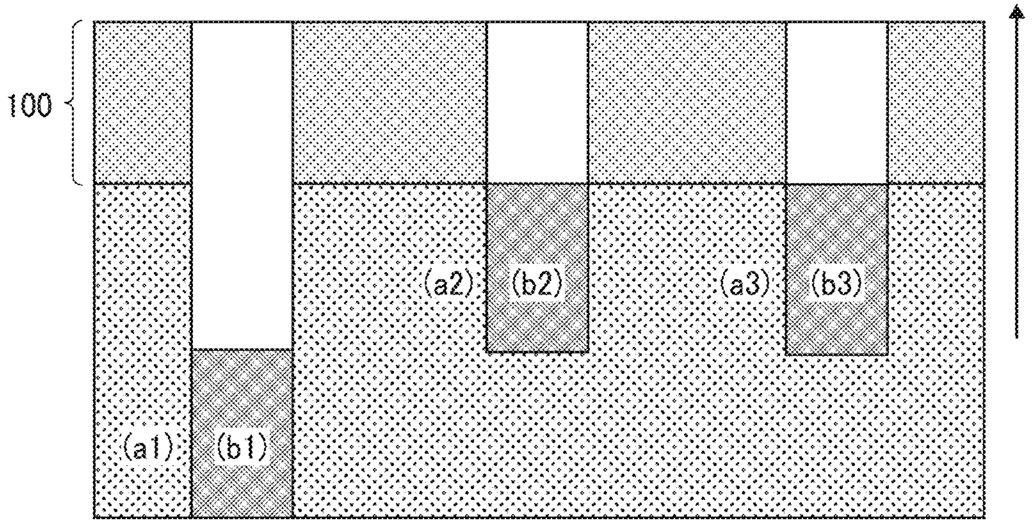
FIG. 3B is a schematic diagram illustrating a ghost image in a vertical bar chart.

The electrophotographic image forming developers 1 to 18 for evaluation in Examples 1 to 13 and Comparative Examples 1 to 5 were placed in a digital full color multi-function peripheral (PRO C9100, manufactured by Ricoh Co., Ltd.). 1,000,000 sheets of an image having an image area ratio of 40% were output. An image of a vertical bar chart including an image part 20 and a non-image part 21, as illustrated in FIGS. 3A and 3B, was output. Next, a density difference between the end of a sleeve round 100 (a1, a2, and a3) and the tip end of the image part at one round (b1, b2, and b3) was measured at three locations, that is, the center, rear, and front, by using an X-RITE 938 (manufactured by X-Rite Inc.), and an average density difference (ΔID) at the three locations was calculated. FIG. 3A illustrates a normal image of the vertical bar chart, and FIG. 3B illustrates ghost images (b1), (b2), and (b3) of the image parts (a1), (a2), and (a3), respectively. In FIGS. 3A and 3B, an arrow indicates a direction of a paper passage, and reference sign "100" indicates one round of the sleeve.

The "ghost image" was evaluated from the calculated density difference (ΔID), based on the following evaluation criteria. "C" or better in the following evaluation criteria indicates that the product can be used in practice.

[Evaluation Criteria]

A: 0.01 or less

B: more than 0.01 and 0.03 or less

C: more than 0.03 and 0.06 or less

F: more than 0.06 to the fourth aspect, the coating layer contains at least one of an acrylic resin and a silicone resin.

According to a sixth aspect, in the electrophotographic image forming carrier according to any one of the first aspect to the fifth aspect, the coating layer further includes inorganic fine particles B.

According to a seventh aspect, in the electrophotographic image forming carrier according to the sixth aspect, the inorganic fine particles B comprise barium sulfate.

According to an eighth aspect, in the electrophotographic image forming carrier according to any one of the first aspect to the seventh aspect, the core particles comprise Mn ferrite.

TABLE 1

| | Electrophotographic image forming carrier | Toner | Electrophotographic image forming developer | Evaluation results: Toner scattering | ID | Carrier adhesion: Edge | Carrier adhesion: Solid | Charge stability over time | Ghost image |
|---|---|---|---|---|---|---|---|---|---|
| Example 1 | 1 | 1 | 1 | A | A | A | A | A | A |
| Example 2 | 2 | 1 | 2 | B | A | A | B | B | B |
| Example 3 | 3 | 1 | 3 | B | A | B | B | A | B |
| Example 4 | 4 | 1 | 4 | B | A | B | B | A | A |
| Example 5 | 5 | 1 | 5 | A | A | B | C | B | A |
| Example 6 | 6 | 1 | 6 | A | A | A | B | A | B |
| Example 7 | 7 | 1 | 7 | C | B | B | C | C | B |
| Example 8 | 8 | 1 | 8 | A | C | B | B | B | B |
| Example 9 | 9 | 1 | 9 | A | B | B | B | B | B |
| Example 10 | 10 | 1 | 10 | A | C | B | B | B | B |
| Example 11 | 11 | 1 | 11 | A | C | B | B | B | C |
| Example 12 | 12 | 1 | 12 | B | A | B | B | C | B |
| Example 13 | 13 | 1 | 13 | C | A | A | C | B | A |
| Comparative Example 1 | 14 | 1 | 14 | B | B | C | F | C | C |
| Comparative Example 2 | 15 | 1 | 15 | B | B | C | F | B | F |
| Comparative Example 3 | 16 | 1 | 16 | B | B | C | F | B | B |
| Comparative Example 4 | 17 | 1 | 17 | C | A | A | F | C | A |
| Comparative Example 5 | 18 | 1 | 18 | F | A | B | C | F | B |

Aspects of the present invention include the following aspects, for example.

According to a first aspect, an electrophotographic image forming carrier comprises core particles and a coating layer coating a surface of the core particles, in which the coating layer contains antimony-containing particles comprising inorganic fine particles A and antimony-doped tin oxide disposed on a surface of the inorganic fine particles A, and the electrophotographic image forming carrier has an apparent density is 2.0 g/cm$^3$ or more and 2.5 g/cm$^3$ or less.

According to a second aspect, in the electrophotographic image forming carrier according to the first aspect, the antimony includes diantimony pentoxide.

According to a third aspect, in the electrophotographic image forming carrier according to any one of the first aspect and the second aspect, the inorganic fine particles include aluminum oxide.

According to a fourth aspect, in the electrophotographic image forming carrier according to any one of the first aspect to the third aspect, a content of the antimony-containing particles is 20 parts by mass or more and 60 parts by mass or less with respect to 100 parts by mass of the coating layer.

According to a fifth aspect, in the electrophotographic image forming carrier according to any one of the first aspect According to a ninth aspect, in the electrophotographic image forming carrier according to any one of the first aspect to the eighth aspect, the core particles have an apparent density of 2.1 g/cm$^3$ or more and 2.6 g/cm$^3$ or less.

According to a tenth aspect, an electrophotographic image forming developer comprises the electrophotographic image forming carrier according to any one of the first aspect to the nineth aspect, and a toner.

According to an eleventh aspect, an electrophotographic image forming method comprises forming an electrostatic latent image on an electrostatic latent image bearer, developing the electrostatic latent image using the electrophotographic image forming developer according to the tenth aspect to form a toner image, transferring the toner image onto a recording medium, and fixing the transferred toner image on the recording medium to form an image.

According to a twelfth aspect, an electrophotographic image forming apparatus comprises an electrostatic latent image forming device to form an electrostatic latent image on an electrostatic latent image bearer, a toner image forming device to develop the electrostatic latent image using the electrophotographic image forming developer according to the tenth aspect to form a toner image, a transfer device to transfer the toner image onto a recording medium, and a fixing device to fix the transferred toner image on the recording medium to form an image.

According to the electrophotographic image forming carrier according to the first to ninth aspects, the electrophotographic image forming developer according to the tenth aspect, the electrophotographic image forming method according to the eleventh aspect, and the electrophotographic image forming apparatus according to the twelfth aspect, it is possible to solve the above-described conventional problems and achieve the object of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An electrophotographic image forming carrier comprising:

core particles; and a coating layer coating a surface of the core particles, wherein the coating layer contains antimony-containing particles comprising:

inorganic fine particles A; and antimony-doped tin oxide disposed on a surface of the inorganic fine particles A, wherein the electrophotographic image forming carrier has an apparent density of 2.0 $g/cm^3$ or more and 2.5 $g/cm^3$ or less, and wherein the antimony comprises diantimony pentoxide.

2. The electrophotographic image forming carrier according to claim 1, wherein the inorganic fine particles A comprise aluminum oxide.

3. The electrophotographic image forming carrier according to claim 1, wherein a content of the antimony-containing particles is 20 parts by mass or more and 60 parts by mass or less with respect to 100 parts by mass of the coating layer.

4. The electrophotographic image forming carrier according to claim 1, wherein the coating layer contains at least one of an acrylic resin and a silicone resin.

5. The electrophotographic image forming carrier according to claim 1, wherein the coating layer further contains inorganic fine particles B.

6. The electrophotographic image forming carrier according to claim 5, wherein the inorganic fine particles B comprise barium sulfate.

7. The electrophotographic image forming carrier according to claim 1, wherein the core particles comprise Mn ferrite.

8. The electrophotographic image forming carrier according to claim 1, wherein the core particles have an apparent density of 2.1 $g/cm^3$ or more and 2.6 $g/cm^3$ or less.

9. An electrophotographic image forming developer comprising:

the electrophotographic image forming carrier according to claim 1; and a toner.

10. An electrophotographic image forming method comprising:

forming an electrostatic latent image on an electrostatic latent image bearer;

developing the electrostatic latent image using the electrophotographic image forming developer according to claim 9 to form a toner image;

transferring the toner image onto a recording medium; and fixing the transferred toner image on the recording medium to form an image.

11. An electrophotographic image forming apparatus comprising:

an electrostatic latent image forming device to form an electrostatic latent image on an electrostatic latent image bearer;

a toner image forming device to develop the electrostatic latent image using the electrophotographic image forming developer according to claim 10 to form a toner image;

a transfer device to transfer the toner image onto a recording medium; and a fixing device to fix the transferred toner image on the recording medium to form an image.

* * * * *